(12) United States Patent
Watanabe (10) Patent No.: US 10,671,943 B2
(45) Date of Patent: Jun. 2, 2020

(54) RESERVATION MANAGEMENT SERVER AND METHOD THAT GENERATE A NEW PLAN TO BE RECOMMENDED TO A FACILITY

(71) Applicant: Rakuten, Inc., Tokyo (JP)

(72) Inventor: Taichi Watanabe, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 1239 days.

(21) Appl. No.: 14/778,639

(22) PCT Filed: Mar. 29, 2013

(86) PCT No.: PCT/JP2013/059574
§ 371 (c)(1),
(2) Date: Sep. 21, 2015

(87) PCT Pub. No.: WO2014/155688
PCT Pub. Date: Oct. 2, 2014

(65) Prior Publication Data
US 2016/0042302 A1 Feb. 11, 2016

(51) Int. Cl.
| | | |
|---|---|---|
| G06Q 10/00 | (2012.01) | |
| G06Q 10/02 | (2012.01) | |
| G06F 16/248 | (2019.01) | |
| G06F 16/2455 | (2019.01) | |
| G06F 16/9535 | (2019.01) | |
| G06F 16/2457 | (2019.01) | |
| G06Q 50/14 | (2012.01) | |

(Continued)

(52) U.S. Cl.
CPC ............ *G06Q 10/02* (2013.01); *G06F 16/248* (2019.01); *G06F 16/2455* (2019.01); *G06F 16/24575* (2019.01); *G06F 16/9535* (2019.01); *G06Q 10/0637* (2013.01); *G06Q 50/12* (2013.01); *G06Q 50/14* (2013.01)

(58) Field of Classification Search
CPC combination set(s) only.
See application file for complete search history.

(56) References Cited

U.S. PATENT DOCUMENTS

| | | | |
|---|---|---|---|
| 2010/0030589 A1* | 2/2010 | Narayanaswami | .... G06Q 10/00 705/5 |
| 2010/0228590 A1* | 9/2010 | Muller | ................... G06Q 10/10 705/319 |

(Continued)

FOREIGN PATENT DOCUMENTS

JP 2008-192088 A 8/2008

*Primary Examiner* — Tonya Joseph
(74) *Attorney, Agent, or Firm* — Sughrue Mion, PLLC (57) ABSTRACT

The information providing server retrieves piece of first posted information, posted by user, on a base plan provided by a facility that requests a recommended plan, and also retrieves piece of second posted information, posted by the user, on reference plan different from the base plan. The information providing server identifies first popular element popular with the user, who posted the piece of first posted information, and also identifies second popular element that are popular with the user and different from the first popular element. Then, the information providing server determines the identified first popular element and second popular element as plan elements included in a new recommended plan to be recommended for the facility that requests the recommended plan.

19 Claims, 4 Drawing Sheets

(51) Int. Cl.
*G06Q 50/12* (2012.01)
*G06Q 10/06* (2012.01)

(56) References Cited

U.S. PATENT DOCUMENTS

| | | | |
|---|---|---|---|
| 2010/0312586 A1* | 12/2010 | Drefs | G06Q 10/02 705/5 |
| 2013/0132854 A1* | 5/2013 | Raleigh | G06F 3/0482 715/738 |
| 2013/0198277 A1* | 8/2013 | Pedregal | G06Q 50/01 709/204 |
| 2013/0268302 A1* | 10/2013 | Jayaram | G06Q 30/06 705/5 |
| 2014/0316829 A1* | 10/2014 | Bumbernick | G06Q 10/025 705/6 |
| 2015/0058324 A1* | 2/2015 | Kauwe | G06F 16/24575 707/722 |
| 2015/0254357 A1* | 9/2015 | Thota | G06F 16/9537 707/706 |
| 2016/0371800 A1* | 12/2016 | Kirshenboim | G06Q 50/01 |

\* cited by examiner

FIG. 3A

| USER INFORMATION DB 21 |
|---|
| USER ID |
| LOGIN ID |
| PASSWORD |
| NICKNAME |
| NAME |
| GENDER |
| AGE |
| ADDRESS |
| ......... |

FIG. 3B

| FACILITY INFORMATION DB 22 |
|---|
| FACILITY ID |
| LOGIN ID |
| PASSWORD |
| FACILITY NAME |
| FACILITY IMAGES |
| FACILITY CHARACTERISTICS |
| PLAN ELEMENTS |
| ADDRESS |
| ......... |

FIG. 3D

| PLAN INFORMATION DB 23 | | |
|---|---|---|
| FACILITY ID | PLAN ID | |
| | PLAN INFORMATION | PLAN NAME |
| | | PERIOD |
| | | CHARGE |
| | | PLAN ELEMENTS |
| | | ..... |
| | TRANSACTION INFORMATION | USER ID OF USER WHO MADE RESERVATION |
| | | DATES OF USE |
| | | THE NUMBER OF USERS |
| | | ..... |
| | PLAN SALES | |
| | PLAN OCCUPANCY RATE | |
| | POSTED INFORMATION | REVIEW |
| | | RATING VALUES |
| | | POST DATE AND TIME |
| | | USER ID OF POSTER |
| | | ..... |
| ......... | | |

FIG. 3C

HOTEL X

| CATEGORY 1 (SUPER-CATEGORY) | CATEGORY 2 (SUB-CATEGORY) | PLAN ELEMENT |
|---|---|---|
| FOOD | FOOD | INCLUDING BREAKFAST |
| | | INCLUDING LUNCH |
| | | INCLUDING DINNER |
| | INGREDIENTS | ALL-YOU-CAN-EAT CRAB |
| | | INCLUDING SPINY LOBSTER |
| | | INCLUDING ANGLERFISH HOTPOT |
| | | INCLUDING BOAT-WRAP SASHIMI |
| | | YAMAGATA BEEF |
| | | OTAWARA BEEF |
| | | TANBA BEEF |
| | | EDIBLE WILD PLANTS |
| | ALCOHOLIC | LOCAL SAKE |
| | | LOCAL BEER |
| | | WINE |
| | | SAKE |
| | | SHOCHU |
| | ADDITIONAL SERVICES | ALL YOU CAN DRINK |
| | | ROOM SERVICE |
| BATH | ROOM | ROOM WITH OPEN-AIR BATH |
| | | ROOM WITH INDOOR BATH |
| | DISCOUNT | NO CHARGE FOR RESERVED OPEN-AIR BATH |
| SERVICES | THERAPIES | MASSAGE |
| | | BEAUTY TREATMENT |
| | ADDITIONAL SERVICES | NO CHARGE FOR BRANDED YUKATA |
| | | EARLY CHECK-IN |
| | | LATE CHECKOUT |
| | | FLOOR ASSURANCE *20TH OR HIGHER |
| | LEISURE | TICKET *OUTSIDE FACILITY |
| | | DIVING |
| | | FISHING |
| ......... | | |

FIG. 3E

HOTEL X

| PLAN NAME | PLAN ELEMENT | SALES RANKING | OCCUPANCY RATE |
|---|---|---|---|
| PLAN XA | ALL-YOU-CAN-EAT CRAB | 1 | 90% |
| | NO CHARGE FOR BRANDED YUKATA | | |
| PLAN XB | INCLUDING BOAT-WRAP SASHIMI | 3 | 70% |
| | LATE CHECKOUT | | |
| PLAN XC | INCLUDING ANGLERFISH HOTPOT | 2 | 60% |
| | NO CHARGE FOR RESERVED OPEN-AIR BATH | | |
| | DIVING | | |

FIG. 4

RESERVATION MANAGEMENT SERVER AND METHOD THAT GENERATE A NEW PLAN TO BE RECOMMENDED TO A FACILITY

TECHNICAL FIELD

The present invention relates to the technical field of a system and the like that can design transaction objects such as plans provided by facilities.

BACKGROUND ART

A variety of facility reservation systems are conventionally known. For example, Patent Literature 1 discloses a reservation system that accepts reservations for hotel and car rental plans. In such a system, users view prepared plans presented to them and then reserves their desired plans.

CITATION LIST

Patent Literature

Patent Literature 1: JP 2008-192088 A

SUMMARY OF INVENTION

Technical Problem

By the way, plans provided to users by facilities are created by designers who analyze the reservation results and the browsing logs of plans currently being provided or provided before and predict future demand for plans. That is, the design of plans depends on the designer's experience and skill. Thus, plans that do not meet user needs may be designed and result in the loss of sales opportunities by facilities.

Therefore, in view of the above points, it is an object of the present invention to provide an information processing device, an information processing method, and an information processing program that can efficiently determine plan elements included in a new transaction object, such as a plan, which is likely to meet user needs, while utilizing (leaving) plan elements popular among users in plans currently being provided or provided before.

Means for Solving the Problem

In order to solve above problem, an invention described in claim 1 is characterized in that an information processing device that can access posted information storage means for storing pieces of posted information, posted by users, on each of a plurality of transaction objects provided by at least one facilities, the device comprises: first retrieval means for retrieving piece(s) of first posted information on a first transaction object from the posted information storage means, the piece (s) of first posted information being posted by user(s); first identifying means for identifying a first element popular with the user(s), based on the piece(s) of first posted information retrieved by the first retrieval means; second retrieval means for retrieving piece (s) of second posted information on a second transaction object different from the first transaction object from the posted information storage means, the piece (s) of second posted information being posted by the user (s); second identifying means for identifying a second element popular with the user (s), based on the piece (s) of second posted information retrieved by the second retrieval means, the second element being different from the first element identified by the first identifying means; and determining means for determining the first element identified by the first identifying means and the second element identified by the second identifying means as elements included in a new transaction object to be recommended for a facility providing the first transaction object.

According to this invention, it is possible to efficiently determine elements included in a new transaction object that is likely to meet user needs, while utilizing elements popular among users in transaction objects currently being provided or provided before.

An invention described in claim 2 is characterized in that the information processing device according to claim 1, further comprises third retrieval means for retrieving, from equipment information storage means for storing pieces of equipment information indicating equipment available in facilities, equipment information of the facility providing the first transaction object, the equipment information storage means being accessible to the third retrieval means, wherein the second identifying means identifies the second element available in the facility providing the first transaction object, based on both the piece(s) of second posted information and the equipment information retrieved by the third retrieval means.

According to this invention, it is possible to prevent a element relating to equipment unavailable in the facility that requests a recommended new transaction object from being included in the new transaction object.

An invention described in claim 3 is characterized in the information processing device according to claim 1 or 2, wherein, when a proportion of the most popular element in elements popular with the user(s) in the piece(s) of first posted information is greater than or equal to a threshold value, the first identifying means identifies the element as the first element.

According to this invention, it is possible to identify a element that is likely to meet user needs.

An invention described in claim 4 is characterized in the information processing device according to claim 3, wherein, when a proportion of the most popular element in elements popular with the user(s) in the piece(s) of first posted information is below a threshold value, and when a portion of the most popular element in elements popular with user (s) belonging to any of a plurality of user bases, into which users are classified by user attributes, in the piece (s) of first posted information of the user base is greater than or equal to a threshold value, the first identifying means identifies this element as the first element for the user base.

According to this invention, it is possible to identify a element that is likely to meet needs of a certain user base.

An invention described in claim 5 is characterized in the information processing device according to claim 4, wherein the first identifying means identifies, among the plurality of user bases into which users are classified by user attributes, a user base whose number of pieces of posted information over the number of pieces of posted information of all the user bases in the piece (s) of first posted information on the first transaction object is greater than or equal to a threshold value, and identifies the first element for the user base.

According to this invention, it is possible to identify a element that is likely to meet needs of a user base with many posts.

An invention described in claim 6 is characterized in the information processing device according to claim 5, wherein the second identifying means identifies a second element that is different from the first element identified by the first identifying means and popular with the user (s), based on the piece (s) of second posted information posted by user (s) belonging to the identified user base among the piece (s) of second posted information retrieved by the second retrieval means.

According to this invention, it is possible to identify a element that is likely to meet needs of a user base with many posts.

An invention described in claim 7 is characterized in that the information processing device according to any one of claims 1 to 6, further comprises third identifying means for identifying a third element unpopular with the user (s), based on the pieces) of first posted information retrieved by the first retrieval means, wherein the second identifying means identifies an element other than the third element identified by the third identifying means as the second element.

According to this invention, a element that is unlikely to meet user needs can be prevented from being identified.

An invention described in claim 8 is characterized in that the information processing device according to any one of claims 1 to 6, further comprises third identifying means for identifying a third element unpopular with the user (s), based on the piece (s) of first posted information retrieved by the first retrieval means, wherein the second identifying means identifies an element to compensate for the third element identified by the third identifying means as the second element.

According to this invention, a element that is unlikely to meet user needs can be prevented from being identified.

An invention described in claim 9 is characterized in that an information processing method performed by a computer, the method comprising: an information processing device that can access posted information storage means for storing pieces of posted information, posted by users, on each of a plurality of transaction objects provided by at least one facilities; retrieving piece(s) of first posted information on a first transaction object from the posted information storage means, the piece (s) of first posted information being posted by user(s); identifying a first element popular with the user(s), based on the retrieved piece(s) of first posted information; retrieving piece(s) of second posted information on a second transaction object different from the first transaction object from the posted information storage means, the piece (s) of second posted information being posted by the user (s); identifying a second element popular with the user (s), based on the retrieved piece (s) of second posted information, the second element being different from the identified first element; and determining the identified first element and the identified second element as elements included in a new transaction object to be recommended for a facility providing the first transaction object.

An invention described in claim 10 is characterized in that an information processing program for causing a computer to function as: an information processing device that can access posted information storage means for storing pieces of posted information, posted by users, on each of a plurality of transaction objects provided by at least one facilities; first retrieval means for retrieving piece(s) of first posted information on a first transaction object from the posted information storage means, the piece(s) of first posted information being posted by user (s); first identifying means for identifying a first element popular with the user(s), based on the piece (s) of first posted information retrieved by the first retrieval means; second retrieval means for retrieving piece(s) of second posted information on a second transaction object different from the first transaction object from the posted information storage means, the piece(s) of second posted information being posted by the user(s); second identifying means for identifying a second element popular with the user(s), based on the piece(s) of second posted information retrieved by the second retrieval means, the second element being different from the first element identified by the first identifying means; and determining means for determining the first element identified by the first identifying means and the second element identified by the second identifying means as elements included in a new transaction object to be recommended for a facility providing the first transaction object.

Effect of the Invention

According to the present invention, it is possible to efficiently determine elements included in a new transaction object that is likely to meet user needs, while utilizing elements popular among users in transaction objects currently being provided or provided before.

BRIEF DESCRIPTION OF THE DRAWINGS

FIG. 3A is a diagram showing an example of information (entries) stored in the user information database 21.

FIG. 3B is a diagram showing an example of information stored in the facility information database 22.

FIG. 3C is a diagram showing an example of plan elements of a hotel X.

FIG. 3D is a diagram showing an example of information stored in the plan information database 23.

FIG. 3E is a diagram showing an example of the plan names, the plan elements, the sales rankings, and the occupancy rates of plans available in the hotel X.

DESCRIPTION OF EMBODIMENTS

The following describes an embodiment of the present invention with reference to the drawings. In the embodiment described below, the present invention is applied to an information providing system.

[1. Configuration and Functional Overview of Information Providing System]

First, a configuration and a functional overview of an information providing system S according to one embodiment of the present invention will be described with reference to FIG. 1.

Figure 1:
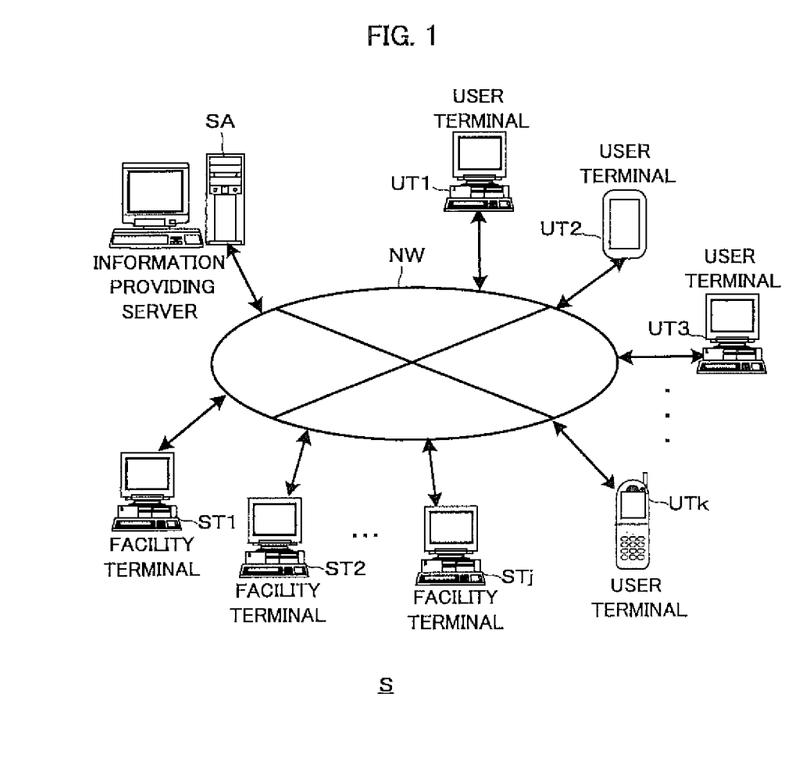
FIG. 1 is a diagram showing an example of a schematic configuration of the information providing system S according to this embodiment.

FIG. 1 is a diagram showing an example of a schematic configuration of the information providing system S according to this embodiment. As shown in FIG. 1, the information providing system S includes a plurality of user terminals UTn (N=1, 2, 3 . . . k), a plurality of facility terminals STm (m=1, 2, 3 . . . j), and an information providing server SA. The user terminals UTn, the facility terminals STm, and the information providing server SA are each connected to a network NW. The network NW includes, for example, the Internet, a dedicated communication line (e.g., community antenna television (CATV) line), a mobile communication network (including base stations), and a gateway.

Each of the user terminals UTn and the facility terminals STm may be, for example, a personal computer (PC), a mobile phone, a personal digital assistant (PDA), a handheld device (smartphone) combining a mobile phone and a personal digital assistant, or a terminal device such as a handheld game console. Each of the user terminals UTn and the facility terminals STm sends a page request (hypertext transfer protocol (HTTP) request) to the information providing server SA through a web browser to obtain a web page, and displays the web page in a window screen on its display.

The information providing server SA is a server (e.g., a web server and databases) installed to manage, for example, a facility reservation site. The facility reservation site is a site that allows users of the user terminals UTn to reserve the use of their desired facilities. Examples of facilities include accommodation facilities (e.g., hotels), golf course facilities, amusement facilities, public facilities, and commercial facilities.

Figure 2A:
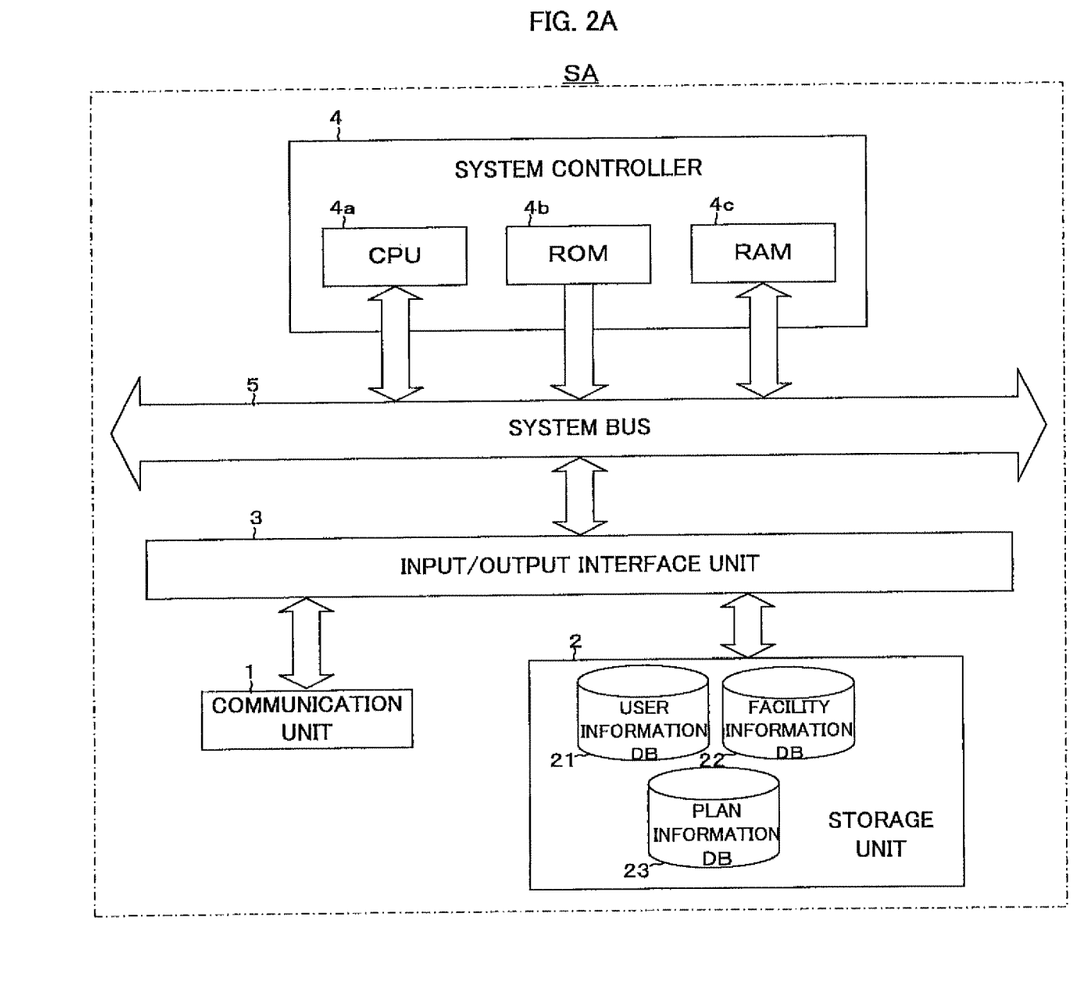
FIG. 2A is a block diagram schematically showing an example configuration of the information providing server SA according to this embodiment.

FIG. 2A is a block diagram schematically showing an example configuration of the information providing server SA according to this embodiment. As shown in FIG. 2A, the information providing server SA includes a communication unit 1, a storage unit 2, an input/output interface unit 3, and a system controller 4. The system controller 4 and the input/output interface unit 3 are connected via a system bus 5. The storage unit 2 is an example of posted information storage means and equipment information storage means, which the system controller 4 of the information providing server SA can access. The system controller 4 constitutes an information processing device according to the present invention.

The communication unit 1 connects to the network NW and controls the state of communications with the user terminals UTn or the facility terminals STm.

The storage unit 2 includes, for example, hard disk drives and stores various programs, such as an operating system and server programs (including an information processing program according to the present invention). For example, the server programs may be delivered from a predetermined server or the like via the network NW, or may be provided via a (computer-readable) recording medium, such as a compact disc (CD) or a digital versatile disc (DVD), storing the programs.

The storage unit 2 also stores structured documents (e.g., hypertext markup language (HTML) documents and XHTML documents), image files, and other files that constitute web pages to be displayed on the user terminals UTn. The storage unit 2 further has, for example, a user information database (DB) 21, a facility information database (DB) 22, and a plan information database (DB) 23, which have been created therein.

FIG. 3A is a diagram showing an example of information (entries) stored in the user information database 21. As shown in FIG. 3A, the user information database 21 stores, in association with each user who has signed up as a user member, the user's user ID, login ID, password, nickname, name, gender, age, address, telephone number, e-mail address, and other information, which have been registered. Each user's user ID is identification information unique to the user. The login ID and the password are authentication information used in a login process (process for authenticating the user). All or some of the user ID, the login ID, the password, the nickname, the name, the gender, the age, the address, the telephone number, and the e-mail address are input from the user terminal UTn and sent to the information providing server SA, for example, when the user signs up as a member.

FIG. 3B is a diagram showing an example of information stored in the facility information database 22. As shown in FIG. 3B, the facility information database 22 stores, in association with each facility that has signed up as a facility member, the facility's facility ID, login ID, password, facility name, facility images, facility characteristics, charges, equipment information, plan elements, address, telephone number, transportation & access, e-mail address, and other information. The login ID and the password are authentication information used in a login process (process for authenticating the facility). The equipment information is information indicating equipment available in the facility. Examples of the equipment include an open-air bath, a pool, a training gym, a karaoke room, a golf course, and a tennis court. Some facilities have no pool or no tennis court. The plan elements are elements that constitute plans available in the facility. FIG. 3C is a diagram showing an example of plan elements of a hotel X. As shown in FIG. 3C, the plan elements are classified into Categories 1 (super-categories) and into Categories 2 (sub-categories). These Category 1 and Category 2 are assigned to each plan element and stored. The plan elements are determined, for example, by each facility. All or some of the facility ID, the login ID, the password, the facility name, the facility images, the facility characteristics, charges, the equipment information, the plan elements, the address, the telephone number, the transportation & access, and the e-mail address are sent from the facility terminal STm and are registered, for example, when the facility signs up as a member.

FIG. 3D is a diagram showing an example of information stored in the plan information database 23. As shown in FIG. 3D, the plan information database 23 stores, in association with each plan (an example of the transaction object) provided by a facility, the plan's plan ID, plan information, transaction information, plan sales, plan occupancy rate, piece (s) of posted information on the plan posted by user (s), and other information. The plan ID and the plan information are stored in response to a request from the facility terminal STm, for example, when the facility creates the plan. The plan information database 23 stores, in association with the plan ID and the plan information of the plan, the facility ID of the facility that provides the plan. The plan information is information indicating details of the plan. For example, the plan information includes information such as the name, the period, the charge, and the plan elements of the plan. The transaction information includes information such as the user ID of a user who reserved the facility, when the user will use the facility (e.g., when the user will stay there, in the case of accommodation facilities), and how many people will use the facility. FIG. 3E is a diagram showing an example of the plan names, the plan elements, the sales rankings, and the occupancy rates of plans available in the hotel X. In the example of FIG. 3E, a plan XA is the best-selling and best-occupied hot item.

Posted information on a plan entered by a user (information posted by a user) includes a character string (in any language, such as Japanese, English, or Chinese) indicating a review (e.g., an impression, an opinion, and a comment) entered by the user, rating values relating to ratings given by the user, and the post date and time. The posted information includes the user ID of the user (poster) who posted the posted information. Alternatively, the posted information is stored in association with the user ID. The rating values are expressed, for example, on a scale of 1 to 5. Users can rate a plan on each of a plurality of rating criteria (also referred to as rating axes) with different viewpoints. Examples of rating criteria for plans provided by accommodation facilities include "location", "room", "food", "bath", "service (hospitality)", and "equipment (amenities)". For example, the average of the rating values on these rating criteria becomes an overall rating (overall rating value) for the plan. For example, when a logged-in user performs a registration operation on an entry page displayed on the user terminal UTn, the posted information on a plan posted by the user is registered.

In the above example, the facility information database 22 and the plan information database 23 are separated from each other, but the facility information database 22 and the plan information database 23 may be integrated together. The above various databases may be included in storage means of a predetermined server that the information providing server SA can access.

The input/output interface unit 3 performs interface processing between the communication unit 1 and the storage unit 2, and the system controller 4.

Figure 2B:
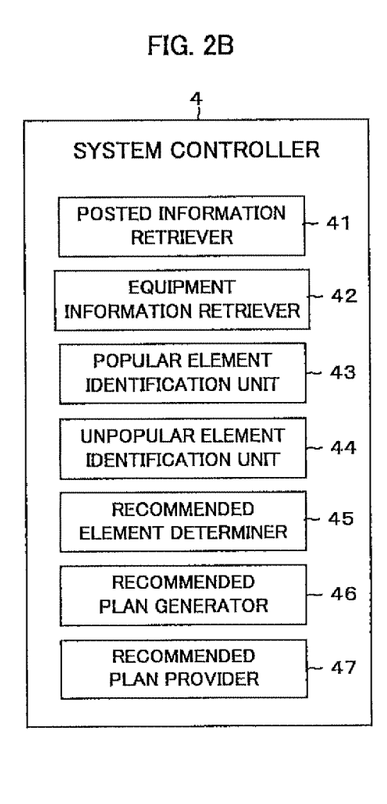
FIG. 2B is a diagram showing an example of functional blocks in the system controller 4.

The system controller 4 includes, for example, a central processing unit (CPU) 4a, a read only memory (ROM) 4b, and a random access memory (RAM) 4c. FIG. 2B is a diagram showing an example of functional blocks in the system controller 4. The system controller 4 as a computer performs a recommended plan providing process for providing recommended plans to facilities in accordance with the server programs stored in the storage unit 2. In such a process, as shown in FIG. 2B, the system controller 4 functions, for example, as a posted information retriever 41, an equipment information retriever 42, a popular element identification unit 43, an unpopular element identification unit 44, a recommended element determiner 45, a recommended plan generator 46, and a recommended plan provider 47. The posted information retriever 41 is an example of first retrieval means and second retrieval means of the present invention. The equipment information retriever 42 is an example of third retrieval means of the present invention. The popular element identification unit 43 is an example of first identifying means and second identifying means of the present invention. The unpopular element identification unit 44 is an example of third identifying means of the present invention. The recommended element determiner 45 is an example of determining means of the present invention.

The posted information retriever 41 retrieves pieces) of first posted information on a plan (an example of a first transaction object) provided by a facility posted by user (s) Ul (l is a natural number greater than or equal to one) from the plan information database 23. The "plan provided by a facility" here is, for example, a plan that becomes a basis for a recommended plan (hereinafter, referred to as a "base plan") to be recommended for the facility. This base plan is determined, for example, based on the sales and the occupancy rates of plans. The base plan may be freely selected, for example, by the facility or a provider of a recommended plan. The piece (s) of first posted information is piece (s) of posted information on the base plan posted by the users) Ul.

The posted information retriever 41 also retrieves piece (s) of second posted information, posted by the users) Ul, on a plan (an example of a second transaction object) different from the base plan from the plan information database 23. The "plan different from the base plan" is hereinafter referred to as a "reference plan". This reference plan may be one of a plurality of reference plans. The user (s) Ul who posted the piece (s) of first posted information and theuser (s) Ul who posted the piece (s) of second posted information are the same. That is, a plurality of pieces of posted information on a plurality of plans including the base plan and the reference plan (s) posted by the same user (s) Ul are used to generate a recommended plan. The facility that provides the reference plan (s) may be different from the facility that provides the base plan. For example, there may be a case where the base plan is provided by the hotel X and the reference plan (s) are provided by a hotel Y.

The equipment information retriever 42 retrieves the equipment information of the facility that provides the base plan from the facility information database 22.

The popular element identification unit 43 identifies, based on the piece (s) of first posted information retrieved by the posted information retriever 41, a first element popular with the user (s) Ul, who posted the piece (s) of first posted information. The first element is hereinafter referred to as a "first popular element". The popular element identification unit 43 may identify a plurality of different first popular elements.

The popular element identification unit 43 also identifies a second element that is different from the first popular element (s) and popular with the user (s) Ul, based on the piece (s) of second posted information retrieved by the posted information retriever 41. The second element is hereinafter referred to as a "second popular element". For example, "no charge for reserved bath" is identified as the second popular element. The popular element identification unit 43 may identify a plurality of different second popular elements. When the facility that provides the base plan and the facility that provides the reference plan (s) are different, piece (s) of posted information on the reference plan (s) may include plan element (s) relating to equipment (e.g., an open-air bath and a pool) unavailable in the facility that provides the base plan (i.e., the facility that requests a recommended plan). To exclude such plan element (s) unavailable in the facility that provides the base plan, the popular element identification unit 43 identifies the second popular element (s) available in the facility, based on the equipment information of the facility, which is retrieved by the equipment information retriever 42.

The unpopular element identification unit 44 identifies third element (s) unpopular with the user (s) Ul, based on the piece (s) of first posted information retrieved by the posted information retriever 41. The third element (s) are hereinafter referred to as "unpopular element (s)". If the unpopular element identification unit 44 identifies unpopular element (s), the popular element identification unit 43 identifies the second popular element (s) from among plan elements other than the unpopular element (s) Alternatively, in this case, the popular element identification unit 43 may identify plan element (s) to compensate for the unpopular element(s) as second popular element(s).

The recommended element determiner 45 determines the first popular element(s) and the second popular element(s) identified by the popular element identification unit 43 as plan elements included in a new plan to be recommended for the facility that requests the recommended plan. The recommended plan generator 46 generates a recommended plan including the plan elements determined by the recommended element determiner 45. The recommended plan provider 47 provides (sends) the recommended plan generated by the recommended plan generator 46 to the facility terminal STm of the facility that requests the recommended plan.

[2. Operation of Information Providing System S]

Figure 4:
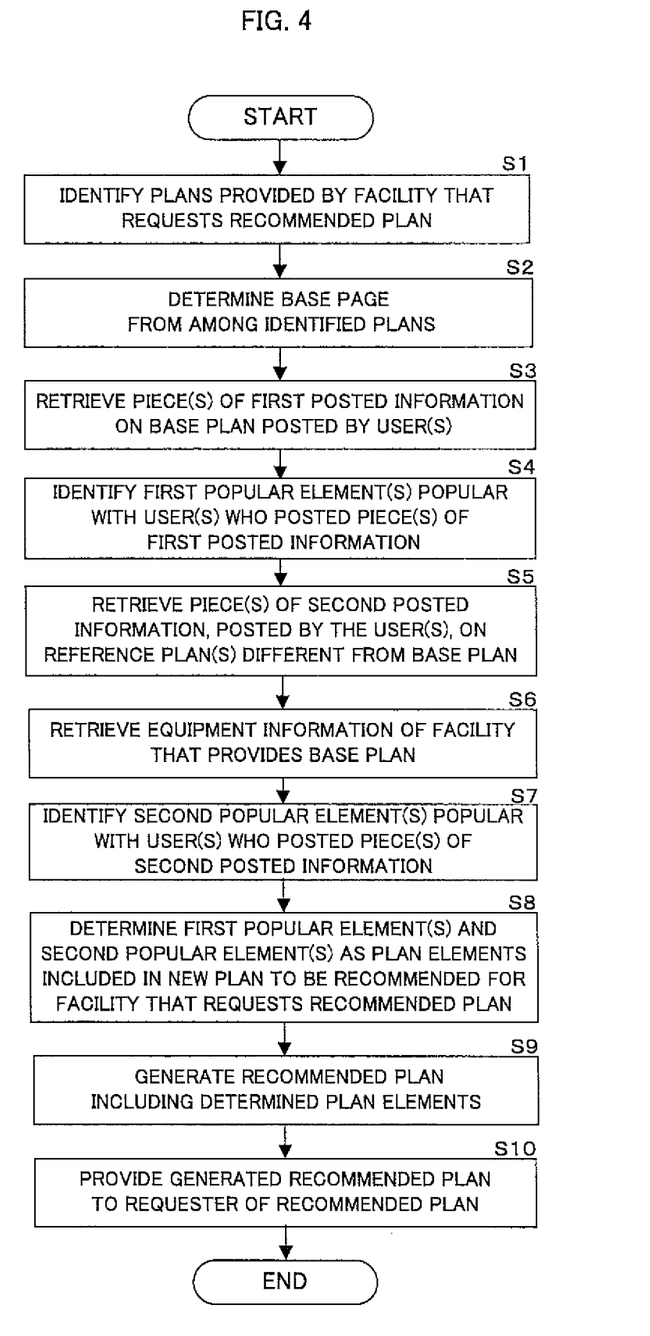
FIG. 4 is a flowchart indicating the recommended plan providing process in the system controller 4 of the information providing server SA.

The following describes an operation of the information providing system S with reference to FIG. 4. FIG. 4 is a flowchart indicating the recommended plan providing process in the system controller 4 of the information providing server SA. For example, a facility terminal ST1 of a facility (e.g., the hotel X) that desires a recommended plan sends a request for the recommended plan to the information providing server SA in accordance with an instruction from an administrator of the facility, after accessing the information providing server SA for the facility to log in to it. Then, when receiving the request for the recommended plan, the information providing server SA initiates the recommended plan providing process shown in FIG. 4.

When the process shown in FIG. 4 is initiated, the system controller 4 identifies, using the facility ID of the facility (e.g., the hotel X) that requests the recommended plan as a key, the plans provided by the facility from the plan information database 23 in the form of their plan IDs (Step S1). Then, the system controller 4 determines a base page from among the plans identified in Step S1 (Step S2). For example, by referring to the plan information database 23, the system controller 4 identifies the base plan based on the plan sales and the plan occupancy rates associated with the plan IDs of the plans identified in Step S1. For example, among three plans shown in FIG. 3E, plans XA, XB, and XC, which are available in the hotel X, the plan XA with the highest sales ranking and occupancy rate is determined as the base plan.

Then, the posted information retriever 41 of the system controller 4 retrieves, using the plan ID of the base plan determined in Step S2 as a key, pieces) of first posted information on the base plan (i.e., piece (s) of posted information associated by the plan ID) posted by the user (s) Ul from the plan information database 23 (Step S3).

Subsequently, based on the pieces) of first posted information retrieved in Step S3, the popular element identification unit 43 of the system controller 4 identifies first popular element (s) popular with the user (s) Ul (e.g., users U1 to U10), who posted the piece (s) of first posted information (Step S4). For example, the popular element identification unit 43 extracts, from among the plan elements set in the base plan identified in Step S2, plan elements appearing in association with positive user evaluations in reviews on the base plan included in the piece (s) of first posted information retrieved in Step S3. Each of plan elements extracted here may be not only the whole character string (e.g., "all-you-can-eat crab") indicating the plan element but also a feature (e.g., "crab") of the character string. That is, the extraction of a feature of the character string is counted in the extraction of the plan elements. The plan elements appearing in the reviews are obtained, for example, by dividing the character strings in the reviews and extracting morphemes by morphological analysis, which is a type of natural language processing. Examples of the plan element(s) appearing in association with the positive evaluations include plan element(s) appearing in the user reviews that are included in the piece(s) of first posted information and are given a high overall rating (e.g., 4 or 5), or plan element(s) appearing with positive word(s) in the user reviews. The positive word(s) included in the reviews are identified by referring to a dictionary storing prepared positive words. The plan element(s) appearing with the positive word(s) mean plan element(s) having a corresponding relationship (e.g., a modification relation) with the positive word (s). Examples of the modification relation include a subject-predicate relation and a modifier-modificand relation. Then, the popular element identification unit 43 counts, for each of the extracted plan elements, the number of appearances of the plan element in the reviews, and identifies, for example, the plan element that appears most frequently as the first popular element, based on the counted numbers. For example, assuming that the number of appearances of "all-you-can-eat crab" included in the plan XA, which is determined as the base plan in FIG. 3E, is "20" and that the number of appearances of "no charge for branded yukata" included in the plan XA is "10", "all-you-can-eat crab" is identified as the first popular element. In this way, plan element (s) popular with users (posters) who used the base plan can be identified as the first popular element (s), and thus a recommended plan that is likely to meet user needs can be generated.

The popular element identification unit 43 of the system controller 4 may identify the first popular element (s) when there is a large difference in the above counted number of appearances of plan elements, for example, when only the number of appearances of a certain plan element is much more than that of the others. In this case, if the proportion of the most popular plan element in the plan elements popular with the user (s) Ul in the above piece (s) of first posted information is greater than or equal to a threshold value (a first threshold value), the popular element identification unit 43 identifies the plan element (the most popular plan element) as the first popular element. The proportion of the most popular plan element here is obtained by "dividing the number of appearances of the most popular plan element by the number of appearances of all the plan elements popular with the user (s)". For example, assume that the plan elements popular with the user (s) in the piece (s) of first posted information on the plan XA are "all-you-can-eat crab" and "no charge for branded yukata" when the threshold value is set to "0.9". Also assume that the number of appearances of "all-you-can-eat crab" is "20" and the number of appearances of "no charge for branded yukata" is "10". In this case, "all-you-can-eat crab" appears most frequently, but the proportion of this (20 over 30) is below the threshold value (there is no large difference in the number of appearances of the plan elements). Thus, no first popular element is identified. On the other hand, for example, assuming that the number of appearances of "all-you-can-eat crab" is "200" and the number of appearances of "no charge for branded yukata" is "10" when the threshold value is set to "0.9", "all-you-can-eat crab" is identified as the first popular element because the proportion of this (200 over 210) is above the threshold value. In this way, plan elements) remarkably popular with, for example, a plurality of users (posters) who used the plan can be identified as the first popular element (s), and thus a recommended plan that is more likely to meet user needs can be generated.

If the proportion of the most popular plan element in the plan elements popular with the users in the pieces of first posted information retrieved in Step S3 is below the threshold value (i.e., there is no large difference between the number of appearances of the plan elements), the users (posters), who posted the above pieces of first posted information, may be classified by user attributes into a plurality of segments (user bases). Then, when there is a large difference among the plan elements popular in the pieces posted information of a segment (user base), the first popular element (s) for the user base having the large difference may be identified. The reason is that there may be a large difference in the number of appearances of the plan elements within a certain range of user base even when there seems to be no large difference among the whole range of users.

More specifically, when there is no large difference in the number of appearances of the plan elements, if the proportion of the most popular plan element in the plan elements popular with the user (s) belonging to any of the user bases, into which the users are classified by user attributes, in the above piece (s) of first posted information of the user base is greater than or equal to the threshold value, the popular element identification unit 43 identifies the plan element (the most popular plan element) as the first popular element for the user base. Thus, a recommended plan that is likely to meet the needs of a certain user base can be generated. Examples of the user attributes include gender, age, and addresses. Examples of the user bases include female users, users in their thirties, and users who live in Hokkaido. When the difference in the number of appearances of plan elements popular with a plurality of users belonging to any of the user bases, into which the users are classified by user attributes, in the above piece (s) of first posted information, is greater than or equal to a threshold value (a second threshold value), the popular element identification unit 43 may identify the plan element that appears most frequently as the first popular element.

When there is no large difference in the number of appearances of the plan elements, the popular element identification unit 43 may identify, among the user bases into which the users are classified by user attributes, a user base whose number of pieces of posted information (the number of posts) over the number (i.e., sum total) of pieces of posted information of all the user bases in the pieces of first posted information on the base plan is greater than or equal to a threshold value (a third threshold value), and identify the first popular element (s) for the user base (i.e., the user base with many posts). Thus, a recommended plan that is likely to meet the needs of a user base with many posts can be generated.

When there is no large difference in the number of appearances of the plan elements, for example, another base plan may be determined, and then Step S3 and subsequent steps may be performed.

Subsequently, the posted information retriever 41 of the system controller 4 retrieves, using the user ID (s) of the user (s) Ul (e.g., users U1 to U10) who posted piece (s) of first posted information retrieved in Step S3 as key (s), piece (s) of second posted information, posted by the user (s) Ul, on reference plan (s) different from the base plan determined in Step S2 from the plan information database 23 (Step S5). That is, piece (s) of posted information associated with the user ID(s) of the users) U1 (e.g., users U1 to U10) are retrieved as the piece (s) of second posted information.

Then, the equipment information retriever 42 of the system controller 4 retrieves, using the facility ID of the facility (e.g., the hotel X) that provides the base plan as a key, the equipment information of the facility that provides the base plan from the facility information database 22 (Step S6). When the facility that provides the base plan and the facility that provides the reference plan (s) are the same, the equipment information may not be retrieved.

Subsequently, based on the pieces) of second posted information retrieved in Step S5, the popular element identification unit 43 of the system controller 4 identifies second popular element (s) popular with the user (s) Ul (e.g., users U1 to U10), who posted piece (s) of second posted information (Step S7). For example, as in Step S4, the popular element identification unit 43 extracts, from among the plan elements set in the above reference plan (s), plan elements appearing in association with positive user evaluations in reviews on the reference plan (s) included in the piece (s) of second posted information retrieved in Step S5. Then, the popular element identification unit 43 counts, for each of the extracted plan elements (i.e., candidates for the second popular element (s)), the number of appearances of the plan element in the reviews, and identifies, for example, the plan element that appears most frequently as the second popular element, based on the counted numbers. For example, assume that the plans XB and XC are identified as the reference plans in FIG. 3E, that the number of appearances of "including boat-wrap sashimi" set in the plan XB is "100", that the number of appearances of "late checkout" set in the plan XB is "5", that the number of applications of "including anglerfish hotpot" set in the plan XC is "10", that the number of appearances of "no charge for reserved open-air bath" set in the plan XC is "200", and that the number of appearances of "diving" set in the plan XC is "150". In this case, "no charge for reserved open-air bath" is identified as the second popular element. In this way, plan element (s) popular with users (posters) who used the reference plan (s) can be identified as the second popular element (s), and thus a recommended plan that is likely to meet user needs can be generated.

The popular element identification unit 43 may identify second popular element (s) that are popular with the user (s) and different from the first popular element (s) identified in Step S3, based on the piece (s) of second posted information posted by the user (s) belonging to the above identified user base (i.e., the user base whose number of pieces of posted information over the number of pieces of posted information of all the user bases is greater than or equal to the threshold value) among the piece (s) of second posted information retrieved in Step S5. Thus, a recommended plan that is likely to meet the needs of a user base with many posts can be generated.

When the equipment information of the facility that provides the base plan in Step S6, the popular element identification unit 43 of the system controller 4 identifies, as the second popular element, for example, the plan element that appears most frequently in the above piece (s) of second posted information, among plan elements relating to the equipment (e.g., an open-air bath) available in the facility, which provides the base plan, based on the equipment information of the facility, which provides the base plan. This can prevent a plan element relating to equipment unavailable in the facility that requests a recommended plan from being included in the recommended plan.

When there are a plurality of plan elements (i.e., candidates for the second popular element (s)) that appear in association with positive user evaluations, that is, a plurality of second popular elements, the unpopular element identification unit 44 of the system controller 4 may identify unpopular element (s) that are unpopular with the user (s) Ul, based on the piece (s) of first posted information retrieved in Step S3. For example, the unpopular element identification unit 44 extracts, from among the plan elements set in the base plan identified in Step S2, plan elements appearing in association with negative user evaluations in the reviews included in the piece (s) of first posted information retrieved in Step S3. Examples of the plan element (s) appearing in association with the negative evaluations include plan element (s) appearing in the user reviews that are given a low overall rating (e.g., 2 or 1), or plan element (s) appearing with negative word (s) in the user reviews. The negative word (s) included in the reviews are identified by referring to a dictionary storing prepared negative words. The plan element (s) appearing with the negative word (s) mean plan element (s) having a corresponding relationship (e.g. a modification relation) with the negative word (s). If the unpopular element identification unit 44 identifies unpopular element (s) in this way, the popular element identification unit 43 identifies, among a plurality of candidates for the second popular element (s), the plan element (s) other than the unpopular element (s) as the second popular element (s). This can exclude plan element (s) unpopular with users (posters) who used the base plan. Thus, a recommended plan that is unlikely to meet user needs can be prevented from being generated. Alternatively, in this case, the popular element identification unit 43 may identify, among a plurality of candidates for the second popular element (s), plan element (s) to compensate for the unpopular element (s) as second popular element (s). For example, when "charge for reserved bath" is identified as an unpopular element, "no charge for reserved bath" is identified as a plan element to compensate for this unpopular element. In this way, popular plan element (s) can be identified by compensating for plan element (s) unpopular with users (posters) who used the base plan. Thus, a recommended plan that is unlikely to meet user needs can be prevented from being generated.

After that, the recommended element determiner 45 of the system controller 4 determines the first popular element (s) identified in Step S4 and the second popular element (s) identified in Step S7 as plan elements included in a new plan to be recommended for the facility that requests the recommended plan (Step S8). Subsequently, the recommended plan generator 46 of the system controller 4 generates a recommended plan including the plan elements determined in Step S8 (Step S9). Then, the recommended plan provider 47 of the system controller 4 provides the recommended plan generated in Step S9 to the facility terminal ST1 of the facility that requests the recommended plan (Step S10). Thus, a facility that requests a recommended plan can obtain a recommended plan that is likely to meet user needs, without depending on the experience and skill of a plan designer. A recommended plan is provided to the facility that requests the recommended plan, for example, by e-mail or through a web page displayed on the facility terminal ST1 after the login of the facility. The generated recommended plan is not provided to the facility that requests it, but recommendation information indicating the plan element determined in Step S8 may be provided to the facility that requests it.

As described above, according to the above embodiment, the information providing server SA retrieves piece (s) of first posted information, posted by users) Ul, on a base plan provided by a facility that requests a recommended plan, and also retrieves piece (s) of second posted information, posted by the user (s) Ul, on reference plan (s) different from the base plan. The information providing server SA identifies first popular element (s) popular with the user (s) Ul, who posted the piece (s) of first posted information, and also identifies second popular element (s) that are popular with the user (s) Ul and different from the first popular element (s). Then, the information providing server SA determines the identified first popular element (s) and second popular element (s) as plan elements included in a new recommended plan to be recommended for the facility that requests the recommended plan. Thus, the information providing server SA can efficiently determine plan elements included in a new recommended plan that is likely to meet user needs, while utilizing (leaving) plan elements popular among users in plans currently being provided or provided before. Consequently, a recommended plan that is likely to meet user needs can be provided to a facility that requests the recommended plan.

Although described as plans provided by facilities in the above embodiment, the transaction objects may be items or services other than such plans.

EXPLANATION OF REFERENCE NUMERALS

1 communication unit
2 storage unit
3 Input/Output Interface Unit
4 System Controller
5 System Bus
UTn User Terminal
STm Facility Terminal
SA Information Providing Server
NW Network

The invention claimed is:

1. A reservation management server that manages one or more facility reservation sites, which are sites that allow users of user terminals to reserve use of desired facilities, the reservation management server comprising:
  a network communication interface configured to communicate over a network with the user terminals and at least one facility terminal;
  at least one memory configured to store computer program code, and one or more databases that correspond to a user information database, a facility information database and a plan information database, wherein
    the user information database stores user identifiers (IDs) identifying users,
    the facility information database stores facility IDs identifying facilities in association with one or more plans, each of the plans including one or more plan elements, which is/are available in the facilities,
    the plan information database stores, for each facility identifier, plan identification information identifying each plan associated with the facility identifier, and stores, for each plan, the plan identifier, the one or more plan elements, transaction use information, user piece(s) of posted information on the plan and one or more of: a plan occupancy rate or plan sales,
    the transaction use information includes the user ID of a user who reserved the facility, and
    the posted information includes a character string indicating a user review or a user rating value(s); and
  at least one processor configured to access said memory and operate as instructed by said computer program code, said computer program code including:
    posted information retrieval code configured to cause at least one of said at least one processor to, based on receiving, over the network via the network communication interface, a request for a recommended plan from a terminal device of a facility: (i) identify, in the plan information database based on the facility identifier, plans provided by the facility that requested the recommended plan, (ii) determine a base plan from among the identified plans provided by the facility based on a ranking of at least one of the plan occupancy rate or the plan sales, and (iii) retrieve, from the plan information database, piece(s) of first posted information related to a first object of the base plan and piece(s) of second posted information related to a second object of a reference plan that is different from the base plan and that is associated with the same or a different facility identifier, wherein the second object is different from the first object, and the user(s) who posted the piece(s) of first posted information and the user(s) who posted the piece(s) of second posted information are the same users who have used the facility of the reference plan;

identifying code configured to cause at least one of said at least one processor to in response to retrieving the piece(s) of first and second posted information: (i) obtain, by performing natural language processing, first plan elements that appear in association with positive user evaluations within the retrieved piece(s) of first posted information, (ii) identify a first element popular with the user(s), based on a number of appearances of the element appearing in association with positive user evaluations in the retrieved piece(s) of first posted information, (iii) obtain, by performing the natural language processing, second plan elements that appear in association with positive user evaluations within the retrieved piece(s) of second posted information, and (iv) identify a second element popular with the user(s), based on a number of appearances of the element appearing in association with positive user evaluations in the retrieved piece(s) of second posted information, wherein the second element is different from the first element, and the first and second elements are obtained by dividing character strings in the respective piece(s) of posted information and extracting morphemes by morphological analysis;

generating code configured to cause at least one of said at least one processor to generate, based on the identified first element and the identified second element, a new plan to be recommended for the facility, the new plan including the identified first and second elements; and transmitting code configured to cause at least one of said at least one processor to transmit, over the network via the network communication interface, the generated new plan to the terminal device of the facility, as a response to the request for the recommended plan.

2. The reservation management server according to claim 1, further comprising third element retrieval code configured to cause at least one of said at least one processor to retrieve, from an equipment information database that stores pieces of equipment information indicating equipment available in facilities, equipment information of the facility providing the first object, the equipment information database being accessible by at least one of said at least one processor, wherein the identifying code causes at least one of said at least one processor to identify the second element available in the facility providing the first object, based on both the retrieved piece(s) of second posted information and the retrieved equipment information.

3. The reservation management server according to claim 1, wherein, when a proportion of the most popular element in elements popular with the user(s) in the piece(s) of first posted information is greater than or equal to a threshold value, the identifying code causes at least one of said at least one processor to identify the most popular element as the first element.

4. The reservation management server according to claim 3, wherein, when the proportion of the most popular element in the elements popular with the user(s) in the piece(s) of first posted information is below the threshold value, and when a portion of another most popular element in elements popular with user(s) belonging to any of a plurality of user bases, into which users are classified by user attributes, in the piece(s) of first posted information of the user base is greater than or equal to the threshold value, the identifying code causes at least one of said at least one processor to identify the another most popular element as the first element for the user base.

5. The reservation management server according to claim 4, wherein the identifying code causes at least one of said at least one processor to identify, among the plurality of user bases into which users are classified by user attributes, a user base whose number of pieces of posted information over the number of pieces of posted information of all the user bases in the piece(s) of first posted information on the first object is greater than or equal to the threshold value, and identifies the first element for the user base.

6. The reservation management server according to claim 5, wherein the identifying code causes at least one of said at least one processor to identify the second element that is popular with the user(s), based on the piece(s) of second posted information posted by user(s) belonging to the identified user base among the retrieved piece(s) of second posted information.

7. The reservation management server according to claim 1, further comprising third element identifying code configured to cause at least one of said at least one processor to identify a third element unpopular with the user(s), based on the retrieved piece(s) of first posted information, wherein the third element is different from the second element.

8. The reservation management server according to claim 1, further comprising third element identifying code configured to cause at least one of said at least one processor to identify a third element unpopular with the user(s), based on the retrieved piece(s) of first posted information, wherein the identifying code causes at least one of said at least one processor to identify, as the second element, an element to compensate for the third element unpopular with the user(s).

9. An information processing method performed by a computer or a server, the method comprising:

storing, in at least one memory, one or more databases that correspond to a user information database, a facility information database and a plan information database, wherein the user information database stores user identifiers (IDs) identifying users, the facility information database stores facility IDs identifying facilities in association with one or more plans, each of the plans including one or more plan elements, which is/are available in the facilities, the plan information database stores, for each facility identifier, plan identification information identifying each plan associated with the facility identifier, and stores, for each plan, the plan identifier, the one or more plan elements, transaction use information, user piece(s) of posted information on the plan and one or more of: a plan occupancy rate or plan sales, the transaction use information includes the user ID of a user who reserved the facility, and the posted information includes a character string indicating a user review or a user rating value(s);

based on receiving, over a network via a network communication interface, a request for a recommended plan from a terminal device of a facility: (i) identifying, in the plan information database based on the facility identifier, plans provided by the facility that requested the recommended plan, (ii) determining a base plan from among the identified plans provided by the facility based on a ranking of at least one of the plan occupancy rate or the plan sales, and (iii) retrieving, from the plan information database, piece(s) of first posted information related to a first object of the base plan and piece(s) of second posted information related to a second object of a reference plan that is different from the base plan and that is associated with the same or a different facility identifier, wherein the second object is different from the first object, and the user(s) who posted the piece(s) of first posted information and the user(s) who posted the piece(s) of second posted information are the same user(s) who have used the facility of the reference plan;

obtaining, by performing natural language processing, first plan elements that appear in association with positive user evaluations within the retrieved piece(s) of first posted information;

identifying a first element popular with the user(s), based on a number of appearances of the element appearing in association with positive user evaluations in the retrieved piece(s) of first posted information;

obtaining, by performing the natural language processing, second plan elements that appear in association with positive user evaluations within the retrieved piece(s) of second posted information;

identifying a second element popular with the user(s), based on a number of appearances of the element appearing in association with positive user evaluations in the retrieved piece(s) of second posted information, wherein the second element is different from the first element, and the first and second elements are obtained by dividing character strings in the respective piece(s) of posted information and extracting morphemes by morphological analysis;

generating, based on the identified first element and the identified second element, a new plan to be recommended for the facility, the new plan including the identified first and second elements; and transmitting, over the network via the network communication interface, the generated new plan to the terminal device of the facility, as a response to the request for the recommended plan.

10. The reservation management server according to claim 2, wherein, when a proportion of the most popular element in elements popular with the user(s) in the piece(s) of first posted information is greater than or equal to a threshold value, the first identifying code causes at least one of said at least one processor to identify the most popular element as the first element.

11. The reservation management server according to claim 10, wherein, when the proportion of the most popular element in the elements popular with the user(s) in the piece(s) of first posted information is below the threshold value, and when a portion of another most popular element in elements popular with user(s) belonging to any of a plurality of user bases, into which users are classified by user attributes, in the piece(s) of first posted information of the user base is greater than or equal to the threshold value, the identifying code causes at least one of said at least one processor to identify the another most popular element as the first element for the user base.

12. The reservation management server according to claim 11, wherein the identifying code causes at least one of said at least one processor to identify, among the plurality of user bases into which users are classified by user attributes, a user base whose number of pieces of posted information over the number of pieces of posted information of all the user bases in the piece(s) of first posted information on the first object is greater than or equal to a threshold value, and identifies the first element for the user base.

13. The reservation management server according to claim 12, wherein the identifying code causes at least one of said at least one processor to identify the second element that is popular with the user(s), based on the piece(s) of second posted information posted by user(s) belonging to the identified user base among the retrieved piece(s) of second posted information.

14. The reservation management server according to claim 3, further comprising third element identifying code configured to cause at least one of said at least one processor to identify a third element unpopular with the user(s), based on the retrieved piece(s) of first posted information, wherein the third element is different from the second element.

15. The reservation management server according to claim 3, further comprising third element identifying code configured to cause at least one of said at least one processor to identify a third element unpopular with the user(s), based on the retrieved piece(s) of first posted information, wherein the identifying code causes at least one of said at least one processor to identify, as the second element, an element to compensate for the third element unpopular with the user(s).

16. The reservation management server according to claim 2, wherein the equipment includes at least one of: an open-air bath, a pool, a training gym, a karaoke room, a golf course, or a tennis court.

17. The reservation management server according to claim 1, wherein when the facility that provides the base plan and the facility that provides the reference plan(s) are different, the piece(s) of posted information on the reference plan include plan element(s) relating to equipment that is unavailable in the facility that provides the base plan.

18. The reservation management server according to claim 1, wherein the one or more plan elements each correspond to a text string describing at least one of: a No Charge element, an all you can eat or drink item, an available physical equipment, an available sporting facility, an available item, an available service, an adjustment on at least one of check-in or check-out, a floor assurance, a ticket or an outside the facility activity that is available with a plan.

19. The reservation management server according to claim 1, wherein the at least one processor stores information regarding the new plan in the plan information database.

* * * * *